United States Patent [19]

Aoyagi

[11] Patent Number: 4,677,647
[45] Date of Patent: Jun. 30, 1987

[54] SYNCHRONIZATION OF MULTICHANNEL RECEIVER BASED ON HIGHER QUALITY CHANNELS

[75] Inventor: Hidehito Aoyagi, Tokyo, Japan

[73] Assignee: NEC Corporation, Tokyo, Japan

[21] Appl. No.: 772,929

[22] Filed: Sep. 5, 1985

[30] Foreign Application Priority Data

Sep. 6, 1984 [JP] Japan .................................. 59-186816

[51] Int. Cl.$^4$ ............................................. H04L 27/16
[52] U.S. Cl. ........................................ 375/97; 375/14; 375/106
[58] Field of Search ................ 370/100; 455/134, 135, 455/136, 139; 375/15, 102, 106, 107, 11, 12, 14, 97

[56] References Cited

U.S. PATENT DOCUMENTS

| | | | |
|---|---|---|---|
| 3,593,147 | 7/1971 | Gurak et al. | 455/139 |
| 3,962,637 | 6/1976 | Motley et al. | 375/14 |
| 4,011,511 | 3/1977 | Chang | 370/100 |
| 4,061,978 | 12/1977 | Motley et al. | 375/14 |
| 4,186,347 | 1/1980 | Brockman et al. | 455/136 |
| 4,344,177 | 8/1982 | Kustka | 375/16 |

OTHER PUBLICATIONS

Ungerboeck, G., "Fractional Tap—Spacing Equalizer and Consequences for Clock Recovery in Data Modems", IEEE Transactions on Communications, vol. Com—24, No. 8, pp. 856-864, Aug. 1976.
Hirosaki, B., "An Orthogonally Multiplexed QAM System Using the Discrete Fourier Transform", IEEE Transactions on Communications, vol. COM—29, No. 7, pp. 982-989, Jul. 1981.
Hirosaki, B., "An Analysis of Automatic Equalizers for Orthogonally Multiplexed QAM Systems", IEEE Transactions on Communications, vol. COM—28, No. 1, pp. 73-76, Jan. 1980.

Primary Examiner—Robert L. Griffin
Assistant Examiner—Stephen Chin
Attorney, Agent, or Firm—Schwartz, Jeffery, Schwaab, Mack, Blumenthal & Evans

[57] ABSTRACT

A synchronization of a multichannel receiver based on higher-quality channels capable of establishing and maintaining timing synchronism stably even when the transmission channels deteriorate due to fading. A plurality of power detectors measure the quality of the baseband signals of a plurality of channel lines and generate a quality signal. A plurality of equalizers generate timing phase deviation signals for the channel lines. A selecting circuit selects at least one channel line using the quality signal. A frequency controlling circuit generates a frequency control signal in accordance with at least one timing phase deviation signal from the selected channel line and controls a sampling frequency of a sampling circuit which converts a transmitted signal into digital form. Thus, the sampling frequency for all channel lines is determined by using the timing phase deviation signal obtained from a high quality channel line. As a result, the timing phase control can be established with stability.

4 Claims, 7 Drawing Figures $$D = -\sum_{i=1}^{M} C_i^2 + \sum_{i=M+1}^{N} C_i^2$$

SYNCHRONIZATION OF MULTICHANNEL RECEIVER BASED ON HIGHER QUALITY CHANNELS

BACKGROUND OF THE INVENTION

The present invention relates to a data transmission system employing a plurality of parallel channels, and more specifically to improvements in a timing phase control apparatus used on the receiving side.

The multiplexed parallel transmission system has been widely employed. In this transmission system, various distortions and deviations, such as phase and amplitude distortions and a sampling, timing phase deviation, are absorbed or compensated by an equalizer such as transversal filter, so that the data can be correctly demodulated. As a compensating system for the timing phase deviation, there has heretofore been employed a timing synchronization system which controls the oscillation frequency of a voltage-controlled oscillator (VCO) to optimize the sampling timing phase on the basis of a timing phase deviation data obtained by the equalizer according to the following principle. That is, the distribution of tap coefficient (weight ocefficient) values of the transversal filter expresses the impulse response of the transversal filter. The timing phase deviation makes a tap position giving a maximum coefficient value deviate from the central tap position. Therefore, in the above system, the timing phase deviation data is detected from the change in tap coefficient value, and the voltage-controlled oscillator is so controlled that the maximum coefficient value is located at the central tap position at all times. According to GOTTFRIED UNGERBOEK, for example, the deviation of the tap position giving the maximum tap coefficient is detected by comparing the sum of squared powers of coefficients of the input side and that of the output side with the central tap es a boundary, and the tap coefficients are finely adjusted so that there is no imbalance between the two sums of the squared powers. The details are disclosed in a paper "Fractional Tap-Spacing Equalizer and Consequences for Clock Recovery in Data Modems", IEEE TRANSACTIONS ON COMMUNICATIONS, VOL. COM-24, NO. 8, August, 1976. pp. 856-864.

In a conventional timing synchronizing system, a few channels, whose transmission deteriorations are expected to be relatively small, are selected among a plurality of the parallel channels and used as reference channels throughout the operation of the system. The timing phase deviation data is extracted from the reference channels to control the voltage controlled oscillator. Thus, the tap coefficients of all channels are controlled always based upon thus obtained timing phase deviation data. In the shortwave transmission system, however, unexpected selective fading or radio interference may seriously deteriorate the above-mentioned predetermined channels. Therefore, if the timing synchronization is performed based upon the timing phase deviation data of low accuracy (small S/N ratio) obtained from the thus deteriorated channels, a proper equalization operation is not expected. This causes error in the demodulated data and nonsynchronism.

SUMMARY OF THE INVENTION

The object of the present invention is, therefore, to provide a timing phase control apparatus capable of establishing and maintaining timing synchronism stably even when the transmission channels are deteriorated by the selective fading.

The present invention is featured by monitoring the quality of each of all the channels or a plurality of the predetermined channels to select the best channel, that is, the channel having the best quality, or one or a plurality of the channels whose quality is allowable, and controlling the sampling frequency by the timing phase deviation value of the selected channel or by a mean value of the timing phase deviation values of the selected channels. One example of indexes representing the quality of the channel is a power of the demodulated baseband signal of that channel, and another example is the decision error power produced by the adaptive equalizer of that channel. These quality indexes represent, in other words, the amount of degradation which the signal of each channel has been subjected to on the transmission line. Therefore, the selected channel or channels has the least amount of degradation or the allowable (small) amount of degradation. By employing the timing phase deviation value or values of the channel or channels which has been subjected to no degradation or a small degradation, the sampling frequency can be properly controlled.

Other objects and features of the invention will be clarified from the following description with reference to the accompanying drawings.

DETAILED DESCRIPTION OF THE PREFERRED EMBODIMENTS

Figure 1:
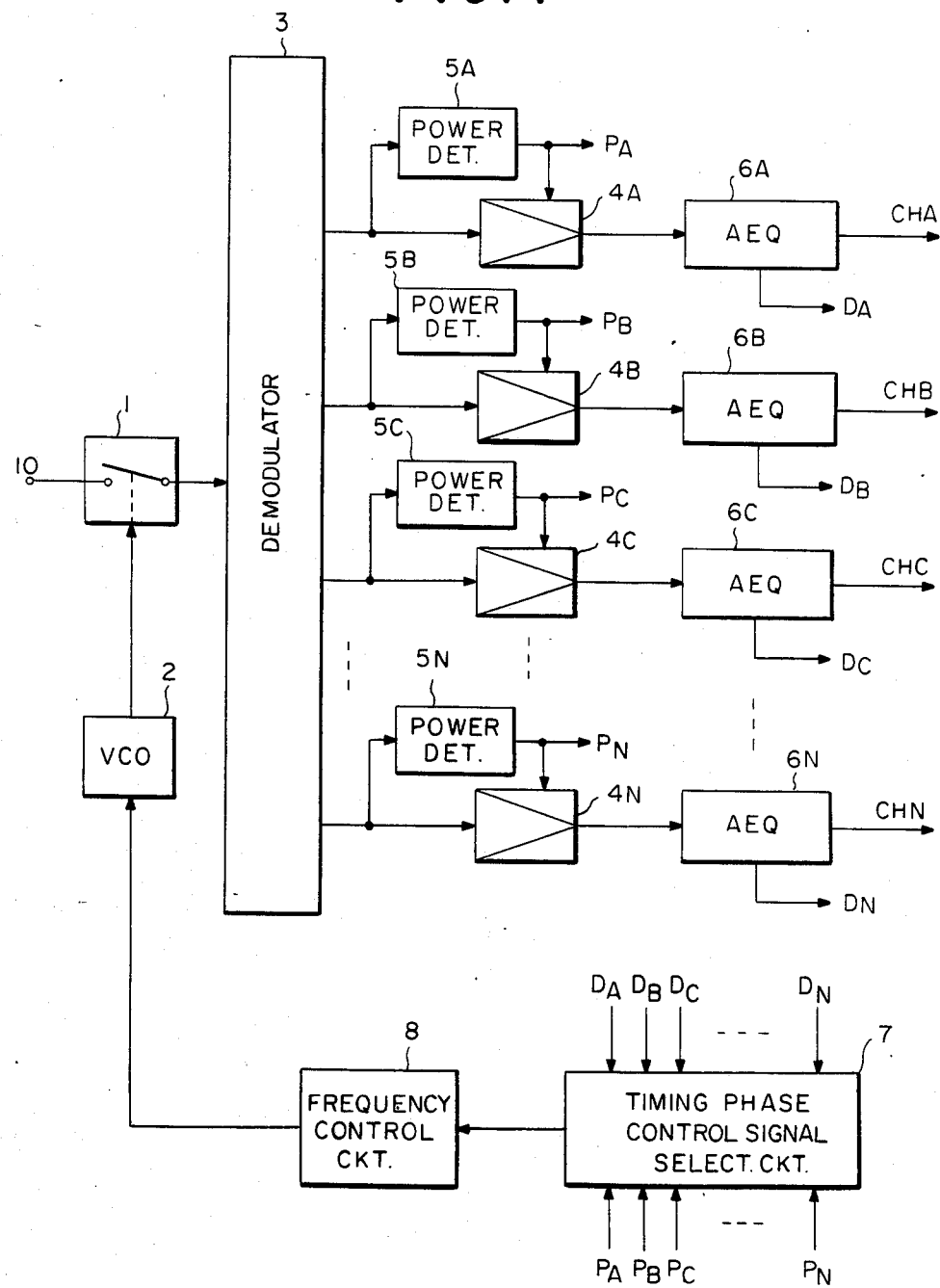
FIG. 1 is a block diagram showing a multiplexed parallel transmission system on the receiving side according to an embodiment of the present invention.

Referring to FIG. 1, transmitted signals are applied to an input terminal 10 and the received signals are sampled, quantized, and converted into digital signals by a sampling circuit 1. A timing clock signal for sampling is generated by an oscillator (such as voltage-controlled oscillator: VCO) 2 and applied to the sampling circuit 1. The frequency of the timing clock signal, that is the sampling frequency at the sampling circuit 1, is controlled by a signal from a frequency control circuit 8. A demodulator 3 receives the digital signals from the sampling circuit 1, demodulates baseband signals of the respective channels, and sends the demodulated signals to the corresponding automatic gain control amplifiers (AGC's) 4A, 4B, 4C, - - - , 4N and to power detectors 5A, 5B, 5C, - - - , 5N that detect the power of each channel baseband signal, and generate power signals $P_A$ to $P_N$. The power signals $P_A$ to $P_N$ are applied to the amplifiers 4A to 4N, respectively, and to a timing phase control signal selecting circuit 7. Such a deomdulator is well known in the art as shown in the paper "An Orthogonally Multiplexed RAM System Using the Discrete Fourier Transform", IEEE TRANSACTIONS ON COMMUNICATIONS, VOL. COM-29, NO. 7, July 1981, pp. 982-989. The gain of each of the amplifiers 4A to 4N is controlled by each of the power signals such that its output may be constant. The thus produced constant outputs of the amplifiers 4A to 4N are then supplied to corresponding automatic equalizers (AEQ's) 6A, 6B, 6C, - - -, 6N. As is well known, the automatic equalizers 6A to 6N are of the transversal type. They equalize amplitude distortion, phase distortion and interchannel interference which the respective channel bands have been, subjected to in transmission and produce the equalized outputs of the respective channels from the output terminals CHA, CHB, CHC, - - -, CHN.

Some or all of these transversal-type automatic equalizers 6A to 6N further have extracting circuits to extract the timing phase deviation data from the tap coefficients. The data $D_A$, $D_B$, $D_C$, - - -, $D_N$ of timing phase deviations produced from the extracting circuits are sent to the timing phase control signal selecting circuit 7.

Figure 2:
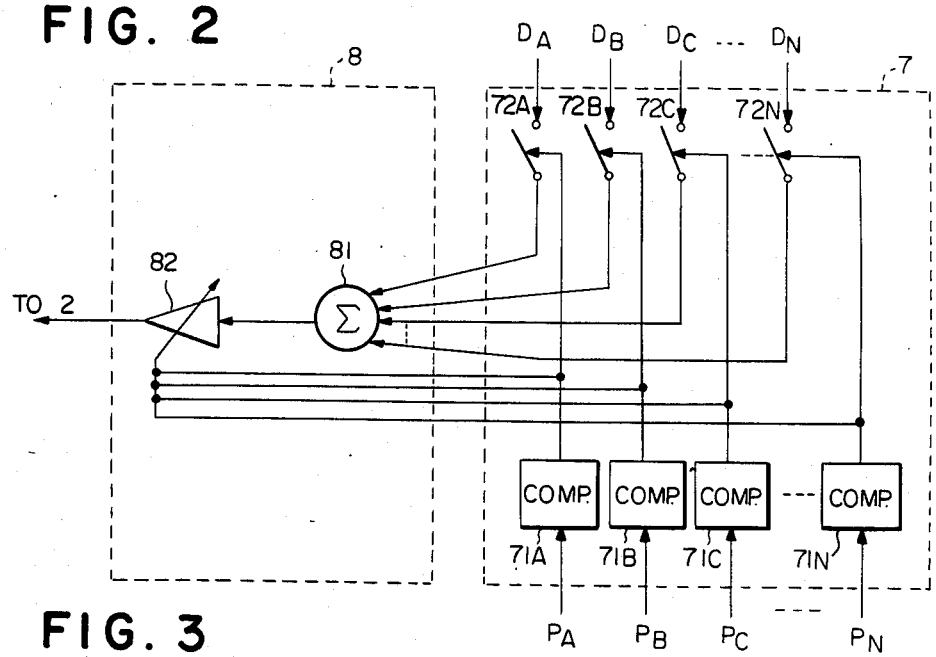
FIG. 2 is a block diagram showing in detail a timing phase control signal selecting circuit 7 and a frequency control circuit 8 shown in FIG. 1.

The timing phase control signal selecting circuit 7 is provided with baseband power signals $P_A$ to $P_N$ of all the channels in this embodiment (or a plurality of channels determined beforehand) detected by the power detectors 5A to 5N, and selects a suitable channel or channels based upon the power signals as mentioned below. FIG. 2 is a diagram showing in detail the circuit 7. The power signals $P_A$ to $P_N$ are compared with a predetermined allowable voltage in comparator circuits 71A, 71B, 71C, - - -, 71N. When the baseband signal power is greater than the allowable voltage, the comparator judges that the channel is deteriorated in transmission, and outputs a switching signal to the corresponding switch out of the switches 72A, 72B, 72C, - - -, 72N. One ends of the switches 72A to 72N are input ends of the circuit 7 for receiving the data $D_A$ to $D_N$ from the equalizers 6A to 6N and the other ends are coupled to an adder 81. When the baseband power signal is greater than the allowable value, the corresponding switch is closed in response to the switching signal. While, the corresponding switch is opened when the baseband signal power is smaller than the allowable voltage. Thus, the signal selecting circuit 7 selects or extracts the timing phase deviation data from channels that are deteriorated relatively little. The extracted timing phase deviation signals are supplied to the adder 81 of a frequency control circuit 8, where the thus extracted signals are added up together and amplified by an amplifier 82. The gain of the amplifier 82 varies responsive to the number of the switching signals produced by the comparator circuits 71A to 71N. Namely, the adder 81 and the amplifier 82 constitute an averaging circuit which generates an average value of timing phase deviation of the selected channels as a frequency control signal for the oscillator 2. By this frequency control signal, the sampling frequency in the sampling circuit 1 is controlled.

According to the present invention as described above, the amounts of deterioration of the respective channels are monitored by detecting the baseband signal powers of predetermined channels (all the channels in the embodiment shown in FIG. 1) to select the channel or channels that are deteriorated little, and the timing is controlled on the basis of the timing phase deviation data of the selected channel or channels only. Therefore, the timing phase deviation data from a channel where the selective fading is taking place is neglected, and the appropriate timing is stably maintained at all times.

In the above-mentioned embodiment, the appropriate channels generating the timing phase deviation data are selected based upon the baseband signal powers of the channels. The appropriate channels, however, can be selected based upon other signal parameters such as a demodulated signal level. Namely, when a demodulated signal level is within a predetermined range around a standard level, i.e., the demodulated signal level is close to the standard level, the channel generating the demodulated signal can be selected, where the standard level is defined by a demodulated signal level under the condition that no problem occurs on the transmission line.

In the embodiment, the signal powers of all the channels are monitored. However, the monitored channels may not be all of the channels but a part thereof which is relatively hardly subjected to deterioration on the transmission line. In usual, the channel in the central portion of the transmission band and the channels therearound are predetermined to be monitored. Moreover, the selected channel may be only one which has the best signal power or the signal power nearest the standard level.

Figure 3:
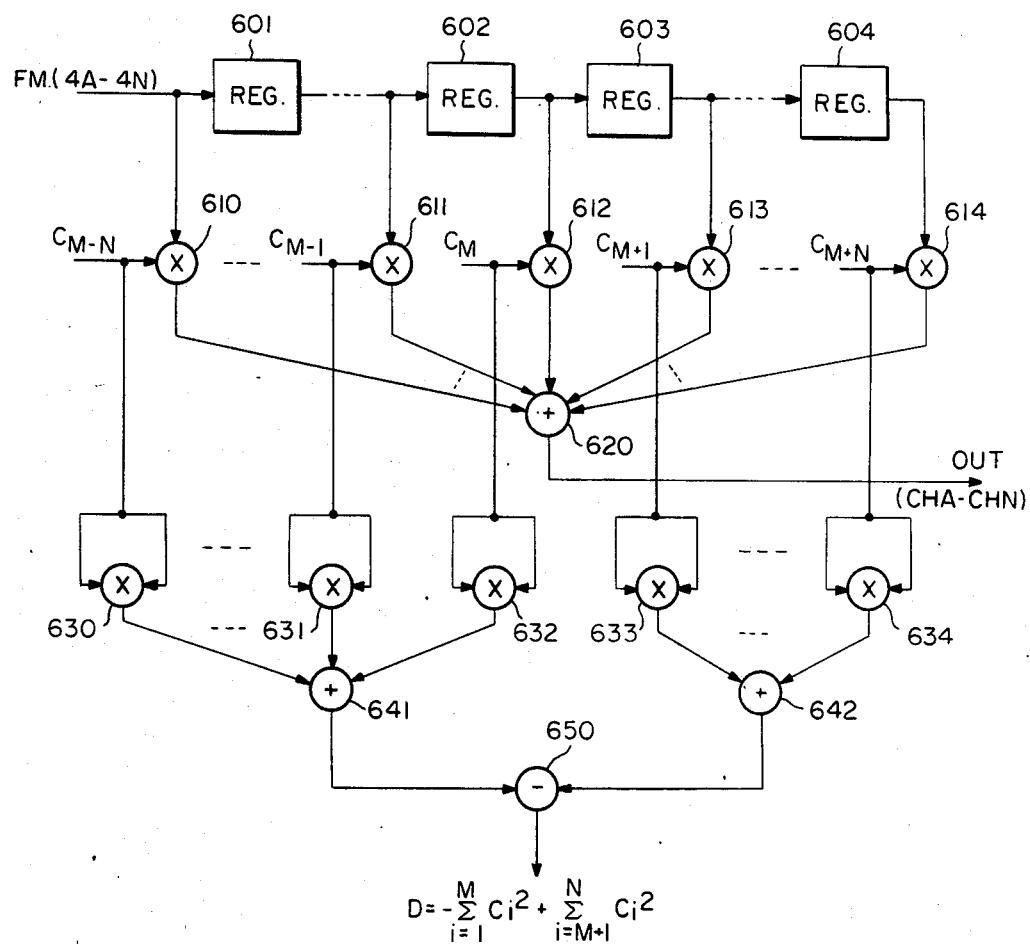
FIGS. 3 and 4 are diagrams illustrating concrete circuits of an equalizer shown in FIG. 1.

FIG. 3 shows a circuit for extracting the timing phase deviation data provided in the transversal-type automatic equalizers 6A to 6N of FIG. 1. This circuit extracts as the timing phase deviation data the difference between the sum of squared powers of tap coefficients of the input side and that of the output side with the central tap as a boundary. Specifically, a demodulated signal is sent to a first-stage register 601 and to a multplier 610. The demodulated signal is multiplied in the multiplier 610 by a coefficient $C_{M-N}$ determined by a known tap coefficient setter (not shown), and is then sent to an adder 620. The demodulated signal is further delayed by a predetermined time period (one-half the sampling period T in this embodiment) through the register 601, multiplied in a multiplier (not shown) by a coefficient $C_{M-N+1}$, and is sent to the adder 620. The registers 602, 603 and 604 have the same function as the register 601. Further, the registers 601 to 604 are constituted by shift registers of (2N+1) stages with taps. The multipliers 611, 612, 613, 614 have the same function as the multiplier 610, and operate to multiply the signals by tap coefficients $C_{M-1}$, $C_M$, $C_{M+1}$, $C_{M+N}$. Outputs of the multipliers 611 to 614 are supplied to the adder 620. The adder 620 generates the equalizer output. Here, the multiplier 612 is used for multiplying a central tap coefficient $C_M$.

The tap coefficients $C_{M-N}$, - - -, $C_{M-1}$, $C_M$, $C_{M+1}$, - - -, $C_M + N$ supplied to the multipliers 610, - - -, 611, 612, 613, - - -, 614 are raised to the second power respectively by the multipliers 603, - - -, 631, 632, 633, - - -, 634. With the position of central tap as a boundary, the sum of squared powers of tap coefficients of the input side and the sum of squared powers of tap coefficients of the output sides are obtained through adders 641 and 642. Outputs of the adders 641 and 642 are sent to a subtractor 650 to calculate a difference between these tow outputs. The calculated difference D is given by the following equation.

$$D = - \sum_{i=1}^{M} C_i^2 + \sum_{i=M+1}^{N} C_i^2$$

The outputs DA to DN of the subtractors 650 in the respective channels are supplied to the signal selecting circuit 7, and in response thereto the frequency control circuit 8 adjusts the oscillation frequency of the oscillator 2 to obtain an optimum sampling timing. In other words, an optimum sampling timing is obtained by adjusting a tap position giving a maximum tap coefficient value to the central tap position.

Figure 4:
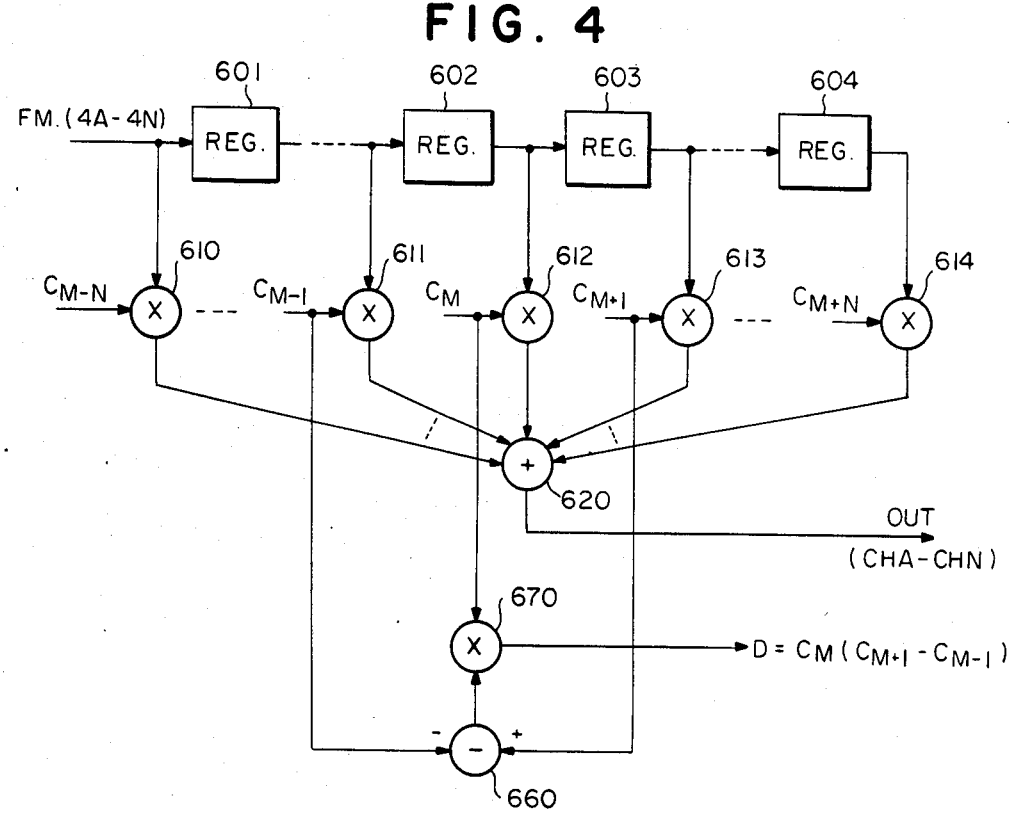

FIG. 4 shows another example of the circuit for extracting timing phase deviation data. According to this circuit, the tap position deviation is developed based upon the balance of the tap coefficient distribution between the input side and the output side with the central tap position as a boundary. Compared with the circuit of FIG. 3, the circuit of FIG. 4 is simplified since there is no need of performing square power calculation.

Figure 5:
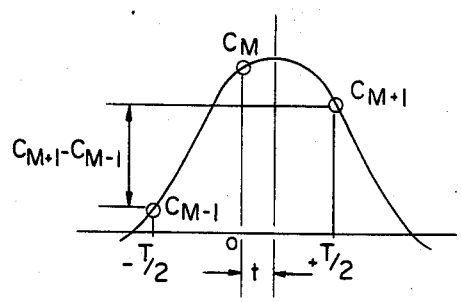
FIGS. 5 and 6 are diagrams explaining the extracting of timing phase deviation data by the equalizer shown in FIG. 4.
Figure 6:
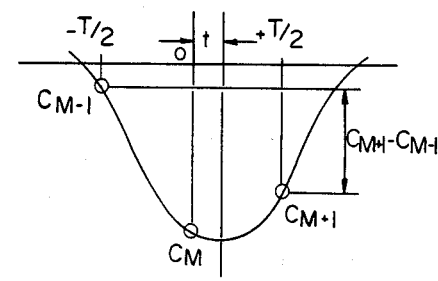

In FIG. 4, registers 601 to 604, multipliers 610 to 614 and an adder 620 constituting a transversal filter are constructed in the same manner as in FIG. 3. The balanced condition of tap coefficients on the input and output sides with the central tap position as a boundary is checked by comparing the tap coefficients $C_{M+1}$ and $C_{M-1}$ at symmetrical positions with each other. That is, a subtractor 660 finds a difference $(C_{M+1}-C_{M-1})$ between the tap coefficients at the symmetrical positions, and the difference is multiplied by the tap coefficient $C_M$ by a multiplier 670 to find the timing phase deviation data D as given by $D=C_M(C_{M+1}-C_{M-1})$. In FIGS. 5 and 6, the abscissa represents the tap position (time corresponding to the tap positions), and the ordinate represents the tap coefficient value. Under the condition where there is no timing phase deviation, the central tap coefficient $C_M$ exists at a peak position of impulse response curve R. As the timing phase deviation (e.g., time t) takes place, on the other hand, the central tap coefficient $C_M$ is deviated from the peak position. According to this embodiment, the deviation is extracted by comparing tap coefficients $C_{M+1}$ and $C_{M-1}$ at symmetrical positions with each other. In FIG. 5, the absolute value of difference $|C_{M+1}-C_{M-1}|$ represents the amount of timing phase deviation, and the polarity thereof represents the direction of timing phase deviation, over a phase deviation range of $+90°$. Over a phase deviation of 90° to 270°, furthermore, the polarity of tap coefficients is inverted as shown in FIG. 6. By multiplying the difference $(C_{M+1}-C_{M-1})$ by $C_M$, the amount of timing phase deviation can be extracted in the same manner as in FIG. 5.

Figure 7:
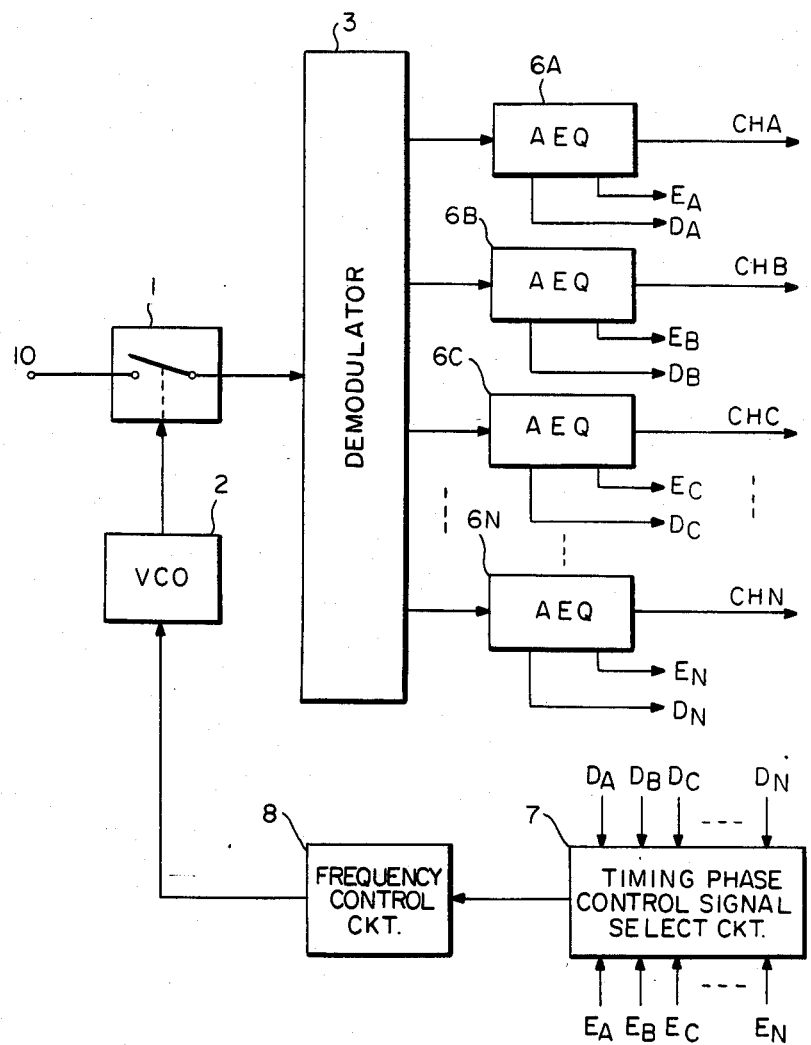
FIG. 7 is a block diagram showing a multiplexed parallel transmission system on the receiving side according to another embodiment of the present invention.

FIG. 7 illustrates another embodiment of the present invention. The embodiment shown in FIG. 1 removes uncertainty in the timing phase deviation data that caused by the decrease in received signal power due to selective fading. This embodiment is capable of removing uncertainty in the timing phase deviation data that caused by radio interference as well as by selective fading.

The embodiment shown in FIG. 7 is different from that in FIG. 1 only with regard to the equalizers 6A to 6N which have a known AGC function and a function to generate a well-known a square error between the actual voltage of the baseband signal and an ideal voltage thereof under the condition that no deterioration occurs in its channel, and to the timing phase control signal selecting circuit 7 which selects the timing phase deviation data $D_A$, $D_B$, $D_C$, - - - , $D_N$ on the basis of the square errors $E_A$, $E_B$, $E_C$, - - - , $E_N$.

The timing phase control signal selecting circuit 7 monitors the square errors of all the channels or a plurality of predetermined channels to select the channel or channels whose square errors is smaller than an allowable value, and the timing phase deviation data of the selected channel or channels is sent to the frequency control circuit 8. When the radio interference is not taking place on the transmission line, the square errors of all the monitored channels are smaller than the value for discrimination. The timing phase deviation data of all the monitored channels are selected and averaged, making it possible to produce a highly accurate timing phase deviation control signal. In contrast, when radio interference occurs on the transmission line, the square error of a channel where the radio interference occurs becomes greater than the allowable value, and therefore, the timing phase deviation data of that channel may fail to exhibit an accurate value. In this case, according to this embodiment, the deteriorated channel is not selected and its the timing phase deviation data is not employed. Therefore, a highly accurate timing phase deviation control signal is obtainable on the basis of the timing phase deviation data from the remaining, non- or less-deteriorated channels. Therefore, the timing phase control signal selected by the timing phase control signal selecting circuit 7 exhibits highly accurate value at all times irrespective of the radio interference on the transmission line.

There can be contrived various other methods to select an optimum channel out of a plurality of monitored channels. For instance, the least-deteriorated channel which has the smallest square error may be selected and the timing phase control signal of that channel only may be used for the timing control.

What is claimed is:

1. A data receiver comprising:

an input terminal receiving transmitted signals which include data on a plurality of parallel channels, a sampling circuit having a first input end coupled to said input terminal, a second input end receiving a sampling clock and an output end outputting sampled digital signals, a clock generator coupled to the second input end of said sampling circuit and generating said sampling clock having a sampling frequency, a demodulator coupled to the output end of said sampling circuit and having a plurality of output ends outputting baseband signals of respective channels, a plurality of channel lines coupled to said plurality of output ends of said demodulator, respectively, a plurality of equalizers provided in said plurality of channel lines, respectively, each of said equalizers having an input and a first output ends coupled to the associated channel line and a second output end outputting a timing phase deviation signal, a timing frequency control circuit having a plurality of first input ends coupled to the second output ends of said equalizers in a plurality of said channel lines, respectively, a plurality of second input ends, and an output end coupled to said clock generator, a plurality of detection means coupled to a plurality of said channel lines, respectively, for detecting the quality of said baseband signals on the associated channel lines, and means for applying outputs of said detection means to said second input ends of said timing frequency control circuit, respectively, said timing frequency control circuit having a determination means coupled to said second input ends thereof for determining at least one such channel line that the detected quality of the baseband signal thereon is allowable, by use of the outputs of said detecting means, a selection means coupled to said first input ends thereof and said determination means for selecting the timing phase deviation signal from the equalizer in the determined channel line, and a generation means coupled to said selection means for generating a timing frequency control signal by use of the selected timing phase deviation signal, said timing frequency control means being applied to said clock generator to control said sampling frequency of said sampling clock.

2. A data receiver according to claim 1, wherein said determination means determines only one channel line whose baseband signal has the best quality.

3. A data receiver according to claim 1, wherein said quality represents an amount of deterioration of said baseband signal which the data of the corresponding channel in said transmitted signals has been subjected to during transmission.

4. A multichannel receiver comprising:

a sampling circuit for receiving transmitted signals modulated by using a transmitter clock and for sampling and converting said transmitted signals into digital signals in synchronization with a sampling clock having a sampling frequency;

a demodulator connected to said sampling circuit for demodulating baseband signals of said digital signals, said demodulator outputting said baseband signals to a plurality of respective channel lines;

a plurality of measuring means connected to said plurality of channel lines, respectively, each generating a quality signal which represents quality of each baseband signal in each corresponding channel line;

a plurality of equalizers connected to said plurality of channel lines, respectively, each generating a timing phase deviation signal which represents a timing phase deviation between said transmitter clock and said sampling clock of each baseband signal in each corresponding channel line;

a selecting circuit coupled to said plurality of measuring means and to said plurality of equalizers and selecting a quality signal which represents an allowable quality among quality signals from said at least one channel line corresponding to the selected quality signal, said selecting circuit outputting a timing phase deviation signal of the determined channel line; and a frequency controlling circuit coupled to said selecting circuit and generating a frequency control signal in accordance with the output timing phase deviation signal from said selecting circuit, said frequency control signal being applied to said sampling circuit to control said sampling frequency of said sampling clock.

* * * * *